United States Patent
Li (10) Patent No.: US 10,766,501 B2
(45) Date of Patent: Sep. 8, 2020

(54) MAGNETIC ELEVATED WHEEL

(71) Applicant: Tong Li, Haslett, MI (US)

(72) Inventor: Tong Li, Haslett, MI (US)

( * ) Notice: Subject to any disclaimer, the term of this patent is extended or adjusted under 35 U.S.C. 154(b) by 758 days.

(21) Appl. No.: 15/368,164

(22) Filed: Dec. 2, 2016

(65) Prior Publication Data

US 2018/0154910 A1 Jun. 7, 2018

(51) Int. Cl.
| | |
|---|---|
| *B61B 13/08* | (2006.01) |
| *B60B 19/00* | (2006.01) |
| *B60B 17/00* | (2006.01) |
| *B61F 15/00* | (2006.01) |

(52) U.S. Cl.
CPC .............. *B61B 13/08* (2013.01); *B60B 17/00* (2013.01); *B60B 19/006* (2013.01); *B61F 15/00* (2013.01)

(58) Field of Classification Search
CPC .......... B60L 13/10; B60L 13/04; B61B 13/08; B60B 19/006; B60B 17/00; B61F 15/00
USPC ....................................................... 188/267
See application file for complete search history.

(56) References Cited

U.S. PATENT DOCUMENTS

| | | | | | |
|---|---|---|---|---|---|
| 5,584,367 A | * | 12/1996 | Berdut | .................... | B60L 13/10 104/283 |
| 6,000,484 A | * | 12/1999 | Zoretich | ............... | B05B 13/005 180/21 |
| 6,357,358 B2 | * | 3/2002 | Henderson | .............. | B60L 13/04 104/130.02 |
| 6,450,103 B2 | * | 9/2002 | Svensson | ................ | B60L 13/06 104/120 |
| 6,684,794 B2 | * | 2/2004 | Fiske | ....................... | B60L 13/04 104/281 |
| 6,886,651 B1 | * | 5/2005 | Slocum | ................... | B60L 13/04 104/281 |
| 2006/0214756 A1 | * | 9/2006 | Elliott | ................... | H01F 7/0236 335/306 |
| 2015/0151572 A1 | * | 6/2015 | Parrott | ................... | B60B 19/12 301/5.23 |

FOREIGN PATENT DOCUMENTS

| | | |
|---|---|---|
| CN | 101623984 A | 1/2010 |
| CN | 101734097 A | 6/2010 |
| CN | 103660784 A | 3/2014 |
| EP | 2210807 A1 | 7/2010 |

OTHER PUBLICATIONS

Kamau, H., "MAGLEV Driveline for Wheeled Fuel Cell Powered Vehicles," SAE Int. J. Alt. Power. 2(1):49-60, 2013, doi:10.4271/2013-01-0473. with publication date of Apr. 8, 2013.
English Translation of CN 101734097.
English Translation o fCN 103660784.
English Translation of CN 101623984.

* cited by examiner

*Primary Examiner* — Scott A Browne
(74) *Attorney, Agent, or Firm* — Fishman Stewart PLLC (57) ABSTRACT

A magnetic elevated wheel assembly of a vehicle may include at least one wheel mounted on an axle, at least one magnet mounted on at least one of the axle or a vehicle body, and a shell connected to the at least one wheel. The shell may extend from the at least one wheel in an axial direction and may be positioned radially outward of at least a portion the at least one magnet. The at least one magnet may be configured and oriented to generate a magnetic force acting on the shell to elevate at least a portion of a weight of the vehicle acting on the axle to balance a rolling resistance acting on the at least one wheel.

20 Claims, 6 Drawing Sheets

MAGNETIC ELEVATED WHEEL

FIELD OF TECHNOLOGY

The present disclosure pertains to a magnetic elevated wheel assembly, for example, for use in a vehicle.

BACKGROUND

All magnetic elevated vehicles (trains) elevate the weight of the vehicle over linear tracks. To generate an elevating magnetic field, high cost tracks and vehicles (trains) make the long distance magnetic elevated vehicles commercially unfeasible.

For the linear magnetic elevation, it is also difficult to control the elevation gap between the vehicle and the tracks. Because the magnetic field force is inversely proportional to the cube of the gap, the normal gap of a linear magnetic elevated vehicle is 15 mm, which would require a very strong magnetic field to achieve the elevation. If the gap is reduced by 3 times, the magnetic field can be reduced by 27 times.

Another difficulty for traditional magnetic elevated vehicles is that the magnetic elevation force is related to the speed of the train. For most of the designs, at lower speeds, traditional wheels and tracks are needed in addition to magnetic elevation tracks, since there is not enough elevating force to keep the train elevated at low speed.

Nonlinear magnetic elevation, especially a rotary magnetic elevation can solve the high cost of tracks and vehicles problems, reduce the elevation gap to dramatically reduce the cost of generating magnetic field for elevation, and provide the elevation force independent of the speed of the vehicle that would reduce the double construction of traditional tracks and magnetic elevation tracks.

Accordingly, an improved, nonlinear magnetic elevation system is presented that can be applied to any vehicle with wheels and that is self-contained such that the system does not rely on special tracks or road.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

To elevate the weight of a vehicle and balance rolling resistance on the vehicle without the need for specialized tracks or roads, the vehicle may employ a self-contained, magnetic elevated rotary assembly, for example, a wheel assembly. An exemplary magnetic elevated rotary assembly may include at least one wheel mounted on an axle, at least one magnet also mounted on the axle, and a supporting shell connected to the at least one wheel, extending from the wheel in an axial direction, and positioned radially outward of the magnet. The at least one magnet may be configured and oriented to generate a magnetic force acting on the supporting shell to lift the supporting shell and wheel. As such, the weight of the vehicle may be elevated to an extent such that at least a portion of the rolling resistance acting on the wheel may be balanced.

An exemplary process for operating a magnetic elevated rotary assembly of a vehicle may include first determining a pressure acting on an axle on which at least one wheel and at least one magnet may be mounted. The process may then include generating a magnetic force to act on a supporting shell connected to the at least one wheel in an axial direction to lift the supporting shell and the at least one wheel. As such, the weight of the vehicle may be elevated to an extent such that at least a portion of the rolling resistance acting on the wheel may be balanced, as described above.

Figure 1A:
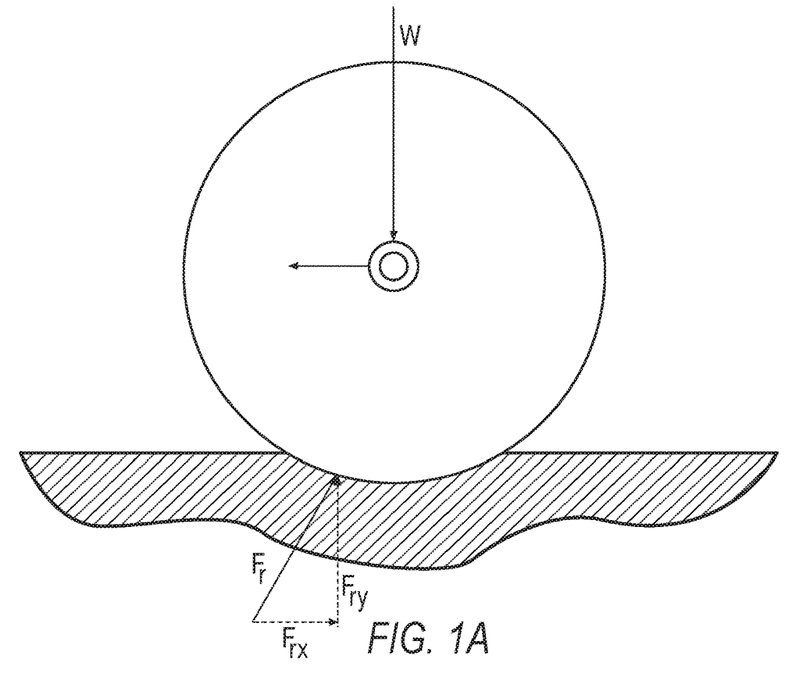
FIG. 1A is a schematic diagram illustrating rolling resistance of a typical wheel.

Referring now to the figures, FIG. 1 illustrates the rolling resistance of a typical wheel under loading. Due to the surface change of the road and the shape change of the wheel, there is a reactionary force $F_r$ acting on the wheel from the road. The vertical component of $F_r$ ($F_{ry}$) is equal to the weight of the wheel W, and the horizontal component of Fr ($F_{rx}$) is the rolling resistance, which acts against the moving direction of the wheel. Thus, in order to keep the constant moving speed, the vehicle has to supply a force to balance the rolling resistance.

Figure 1B:
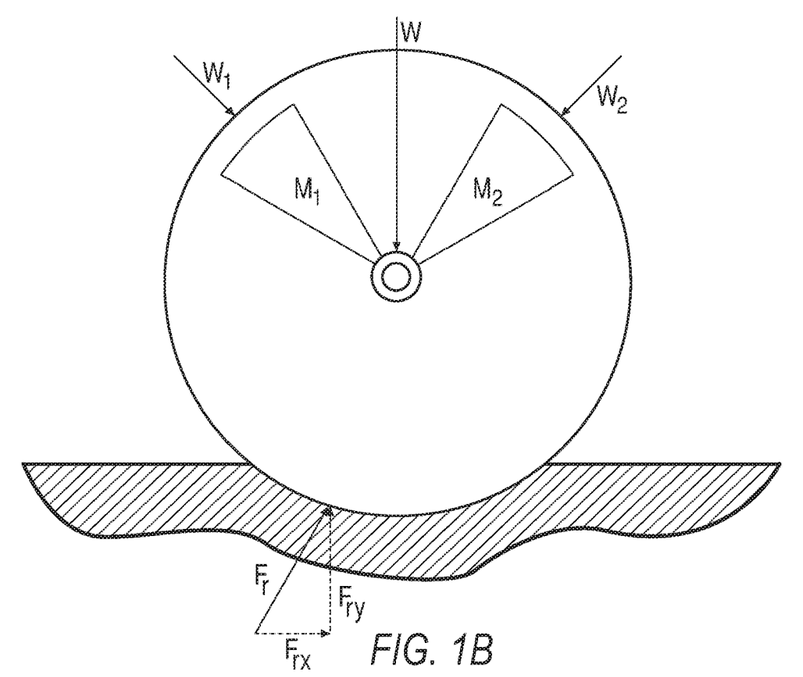
FIG. 1B is a schematic diagram illustrating rolling resistance balance of a wheel with two magnetic elevators to reach magnetic elevation as well as minimize the rolling resistance.
Figure 2:
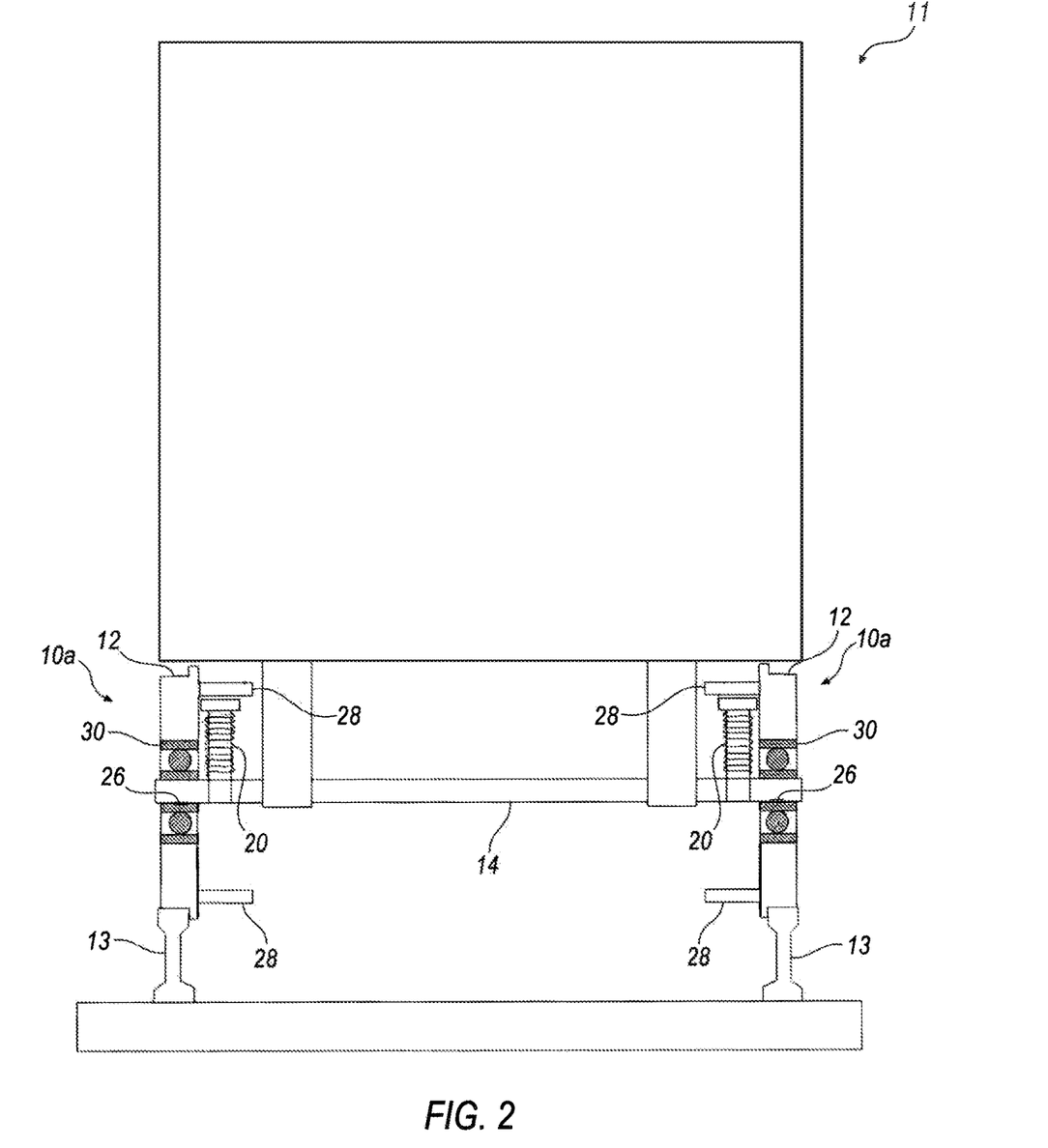
FIG. 2 is schematic, front view of an exemplary vehicle employing a magnetic elevated wheel assembly.

In contrast, FIG. 2 illustrates a wheel employing two adjustable electric magnets $M_1$ and $M_2$ fixed on an axle and attracting an outer shell of the wheel with a magnetic field. If there is a rolling resistance on the road, the two forces $W_1$ and $W_2$ caused by the two magnets $M_1$ and $M_2$ can be adjusted with electric current such that the following vector equation holds true: $F_r = W_1 + W_2$. At the same time, $W_1$ and $W_2$ will elevate the weight off the wheel bearing so that the bearing's rolling resistance approximates zero. Compared to traditional magnetically elevated train systems, where the weight of the train is elevated by magnetic force from the track, the magnets elevate the weight from the axle to the wheel, and at the same time cancel the rolling resistance from between the wheel and road (or tracks) and bearings.

Referring now to FIGS. 2, 3, 4A, and 4B illustrate an exemplary magnetic elevated rotary assembly 10a,b for a vehicle 11, for example, a train, where the rotary assembly 10a,b may move along a track 13. While the rotary assembly 10*a,b* is referred to hereinafter as a wheel assembly, it should be appreciated that magnetic elevation is not limited to being on the wheel, but may be on any rotary assembly. For example, with an electric motor where the axel carries heavy weight, the weight may be elevated on the rotor assembly. The wheel assembly 10*a,b* may include at least one wheel 12 mounted on an axle 14 by a bearing 30. In conventional wheel assemblies, the vehicle weight is set on the axle 14. The wheel assembly 10*a,b* may elevate the weight from the bearing of the wheels by including magnets 18*a*, 18*b* mounted on the axle 14, and a supporting shell 28. The supporting shell 28 may be connected to the wheel 12 and may be located adjacent the wheel 12 in an axial direction and outside the magnets 18*a*, 18*b* in a radial direction. In general, the magnets 18*a*, 18*b* may generate a magnetic force that acts on the supporting shell 28. A vertical component of the magnetic force may equal the weight on the axle 14, thereby making the weight on the axle equal to zero. The magnets 18*a*, 18*b* may be oriented such that they have different poles adjacent the supporting shell 28, and such that an angle is formed between the magnets 18*a*, 18*b*. The angle may be adjustable to obtain an optimal magnetic force for balancing the rolling resistance acting on the wheel. The supporting shell 28 may be made of any magnetic material on which a magnetic force may act, including, but not limited to, steel, metals, and the like.

Figure 3:
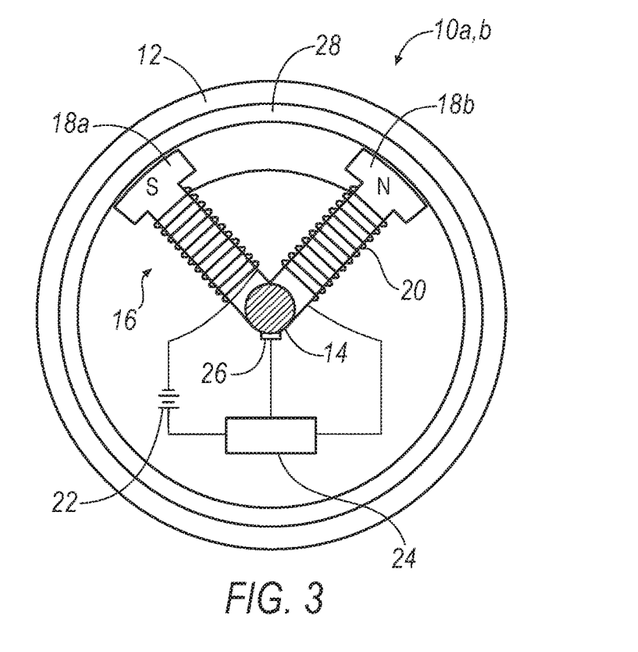
FIG. 3 is a schematic, side view of a magnetic elevated wheel assembly according to one exemplary approach.
Figure 4A:
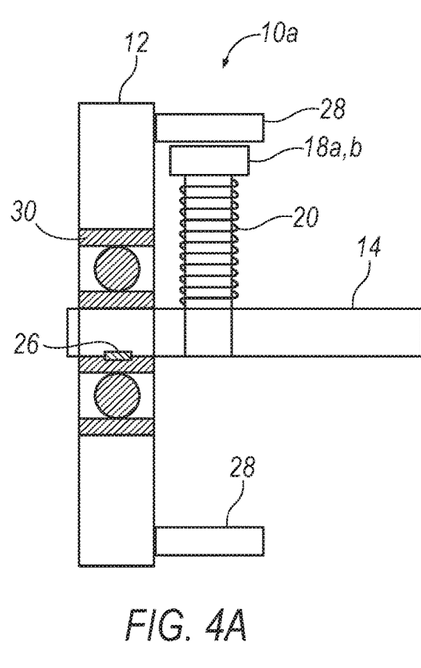
FIG. 4A is a schematic, front view of the wheel assembly of FIG. 1 according to one exemplary approach.
Figure 4B:
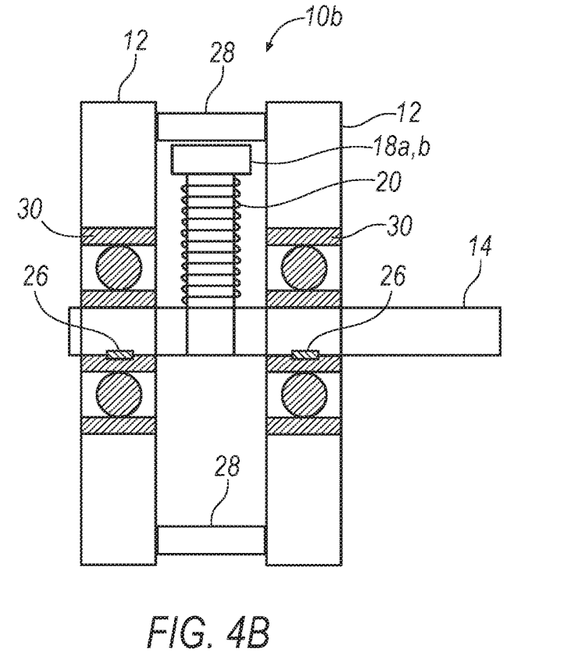
FIG. 4B is a schematic, front view of the wheel assembly of FIG. 1 according to another exemplary approach.

The magnets 18*a*, 18*b* may be electromagnets, as illustrated in FIGS. 3, 4A, and 4B. As such, to generate the magnetic force, the wheel assembly 10*a,b* may include a coil 20 wrapped around the magnets 18*a*, 18*b* and a power source 22 configured to generate a current to pass through the coil 20. The coil 20 may be made of any conductive material, and the power source 22 may be any device capable of generating a current, including, but not limited to, a battery. The wheel assembly 10 may also include a magnetic force regulator 24 connected to the coil 20 and the power source 22 and may be configured to control the magnetic force generated by the magnets 18*a*, 18*b* and how much of the weight on the axle 14 may be balanced. As merely one example, the magnetic force regulator 24 may be a current regulator configured to regulate the amount of current flowing through the coil 20. In addition or alternatively, the magnetic force may be changed by variations in the geometrical form of the wheel assembly 10*a,b*, for example, by increasing or decreasing the gap between the magnets 18*a*, 18*b* and the supporting shell 28, the number of turns of the coil 20, and the like. The wheel assembly 10*a,b* may further include a pressure sensor 26 configured to measure the weight on the axle 14, which may vary due to different factors, such as a change in load on a vehicle employing the wheel assembly 10*a,b*. The magnetic force regulator 24 may be in communication with the pressure sensor 26 such that the magnetic force regulator 24 may make modifications, such as adjusting the current flowing through the coil 20, in real time to account for any variations in the pressure on the axle 14. In addition or alternatively, the wheel assembly 10*a,b* may include pressure sensor(s) on the supporting shell 28 (not shown) to measure the pressure on the supporting shell 28 generated by the magnetic force.

In one exemplary approach depicted in FIG. 4A, the wheel assembly 10*a* may include one wheel 12 mounted on the axle 14. Such a configuration may be used for lighter weight vehicles, including, but not limited to, bicycles, skateboards, and even some automobiles. In another exemplary approach depicted in FIG. 4B, the wheel assembly 10 may include two wheels 12 mounted on the axle 14. Such a configuration may be used for heavier vehicles, including, but not limited to, automobiles, trains, and the like. It should be appreciated that there may be any number of wheels 12, with magnets 18*a*, 18*b* and supporting shells 28 arranged between adjacent wheels 12, as necessary to generate a magnetic force sufficient to balance the pressure on the axle 14.

Figure 5:
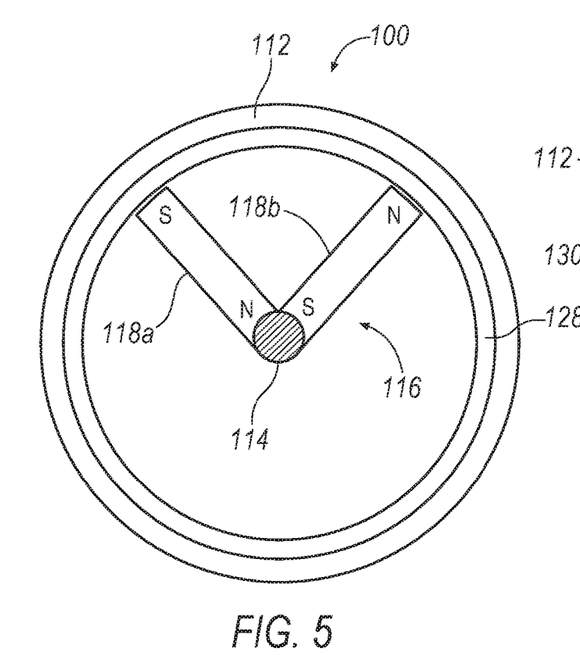
FIG. 5 is a schematic, side view of a wheel assembly according to another exemplary approach.
Figure 6:
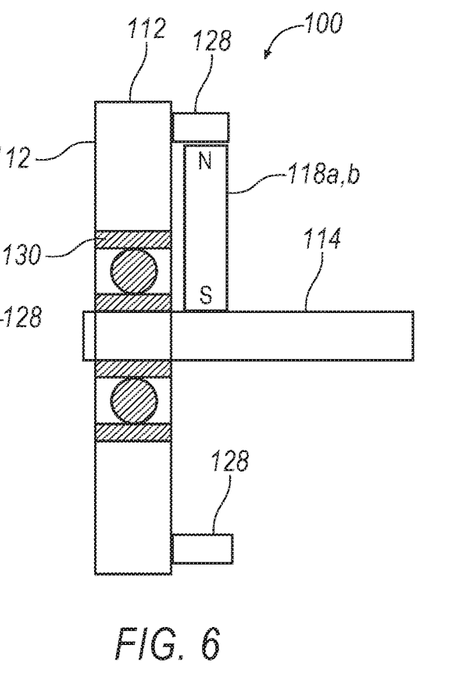
FIG. 6 is a schematic, front view of the wheel assembly of FIG. 5.

Referring now to FIGS. 5 and 6, a wheel assembly 100 according to another exemplary approach is illustrated. The wheel assembly 100 may similarly include a wheel 112 mounted on an axle 114 by a bearing 130, magnets 118*a*, 118*b* mounted on the axle 114, and a supporting shell 128. The supporting shell 128 may be connected to the wheel 112, extending from the wheel 112 in an axial direction, and positioned radially outward of the magnets 118*a*, 118*b*. The magnets 118*a*, 118*b* may generate a magnetic force that acts on the supporting shell 128 to balance at least a portion of the weight on the axle 14 and rolling resistance. The magnetic force may equal the weight on the axle 114, thereby making the pressure on the bottom of the axle equal to zero. The magnets 118*a*, 118*b* may be oriented such that they have different poles adjacent the supporting shell 128, and such that an angle is formed between the magnets 118*a*, 118*b*. The angle may be adjustable to obtain an optimal magnetic force for balancing the weight on the axle 114 and the rolling resistance. The supporting shell 128 may be made of any magnetic material on which a magnetic force may act, including, but not limited to, steel, metals, and the like. The magnets 118*a*, 118*b* may be permanent magnets, thereby eliminating the need for coils and a power source to generate the magnetic force. While FIG. 6 only depicts one wheel 112, it should be appreciated that the wheel assembly 100 may include two wheels 112 with the magnets 118*a*, 118*b* and supporting shell 128 arranged therebetween, similar to the wheel assembly 10*b* illustrated in FIG. 4B.

Figure 7:
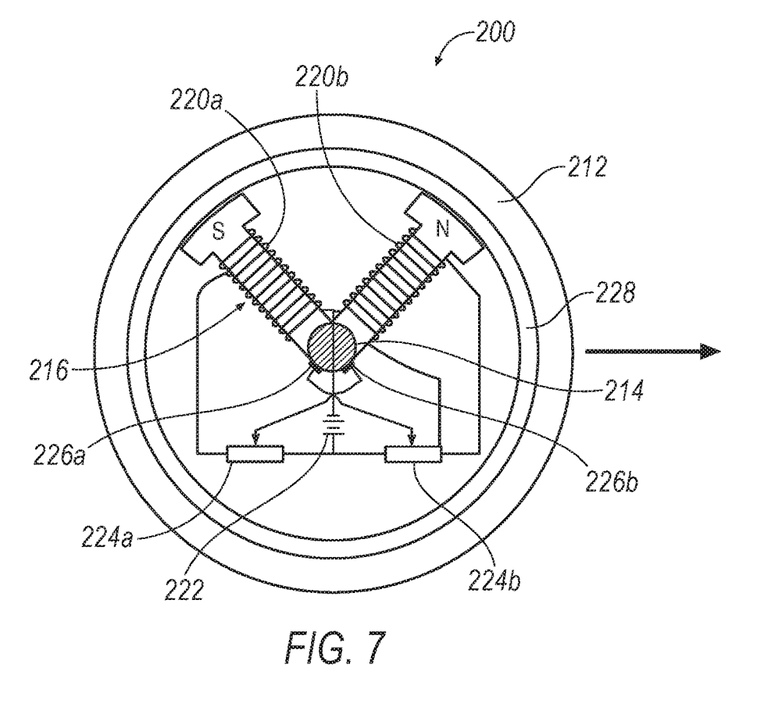
FIG. 7 is a schematic, side view of a wheel assembly according to yet another exemplary approach.

Referring now to FIG. 7, a wheel assembly 200 according to yet another exemplary approach is illustrated. The wheel assembly 200 is a variation of the wheel assembly 10*a,b* in which the magnets 218*a*, 218*b* are electromagnets. However, each of the magnets 218*a*, 218*b* may have its own coil 220*a*, 220*b* wrapped around it and connected to a power source 222. The wheel assembly 200 may also include two magnetic force regulators 224*a*, 224*b* to regulate the magnetic force, such as by regulating the amount of current flowing through the respective coil 220*a*, 220*b*, which may or may not be the same. The wheel assembly 200 may further include two pressure sensors 226*a,b* at different radial locations, and connected to respective ones of the magnetic force regulators 224*a*, 224*b*. When a vehicle employing wheel assembly 200 accelerates in the direction of the arrow, the first pressure sensor 226*a* will measure a higher weight on the axle 214 than the second pressure sensor 226*b*. Thus, the magnet 220*a* on the same side as the first pressure sensor 226*a* will have to generate a greater magnetic force than the other magnet 220*b*. When the vehicle decelerates, then the reverse will be true. Specifically, the second pressure sensor 226*b* will measure a higher weight on the axle 214 than the first pressure sensor 226*a*. Thus, the magnet 220*b* on the same side as the second pressure sensor 226*b* will have to generate a greater magnetic force than the other magnet 220*a*. The magnetic force regulators 224*a*, 224*b* will be able to regulate the currents through the respective coils 220*a*, 220*b* accordingly, based on the pressure readings from the respective pressure sensors 226*a*, 226*b*.

While the figures generally illustrate two magnets for each wheel assembly 10, 100, 200, it should be appreciated that any number of magnets may be used to obtain a configuration in which two separate poles, S and N, are adjacent the supporting shell 28, 128, 228.

Figure 8:
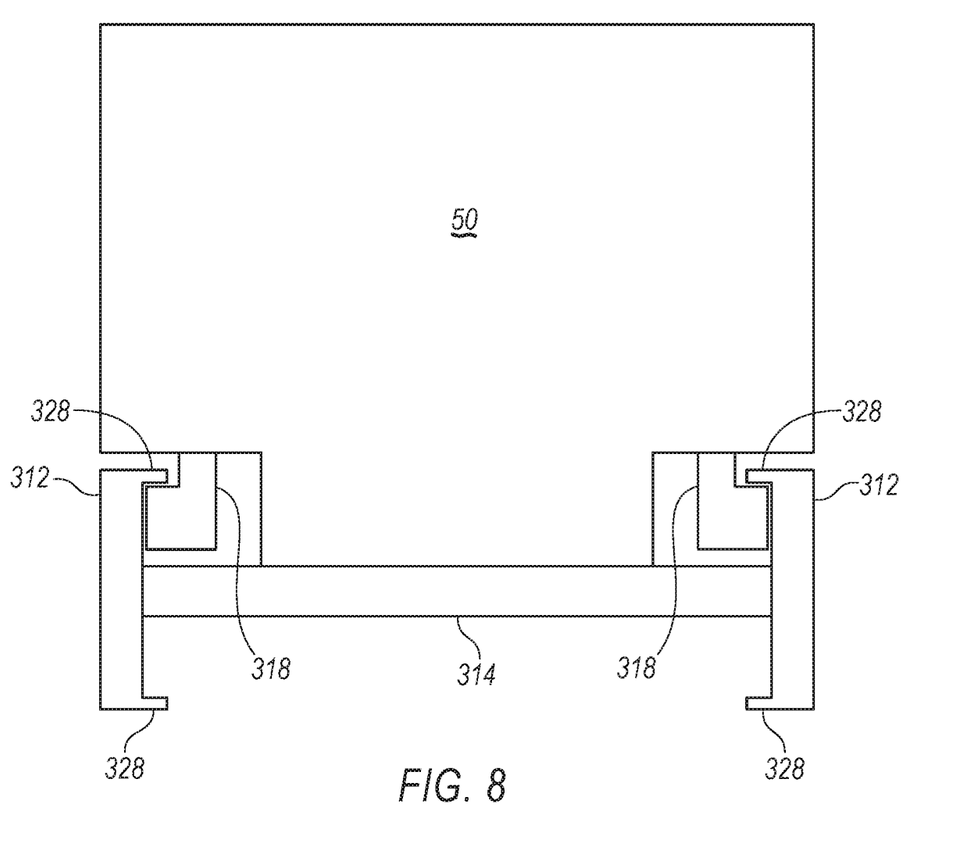
FIG. 8 is schematic, front view of another exemplary vehicle employing a magnetic elevated wheel assembly according to another exemplary approach.

Referring now to FIG. 8, a wheel assembly 300 according to another exemplary approach in which at least one magnet 318 is mounted on a vehicle body 50 is illustrated. This approach may be an alternative to or in addition to magnet(s) mounted an axle, such as in wheel assemblies 10a,b, 100, and 200. The wheel assembly 300 generally may include a wheel 312 and a supporting shell 328 connected to the wheel 312. The shell 328 may be located adjacent the wheel 12 in an axial direction and outside at least a portion of the magnet 318 in a radial direction. It should be appreciated that magnet 318 may include two magnets arranged in a similar configuration with respect to the supporting shell 328 as in wheel assemblies 10a,b, 100, and 200. In addition, wheel assembly 300 may include two wheels 312 between which the supporting shell 328 is arranged, similar to wheel assembly 10b. Further, while not illustrated, it should be appreciated that wheel assembly 300 may include coil(s) wrapped around the magnet(s) 318 and connected to a power source, magnetic force regulator(s) to regulate the amount of current flowing through the coil(s), and pressure sensor(s) mounted on the axle 314 to measure the weight on the axle 314, similar to wheel assemblies 10a,b, and 200.

Figure 9:
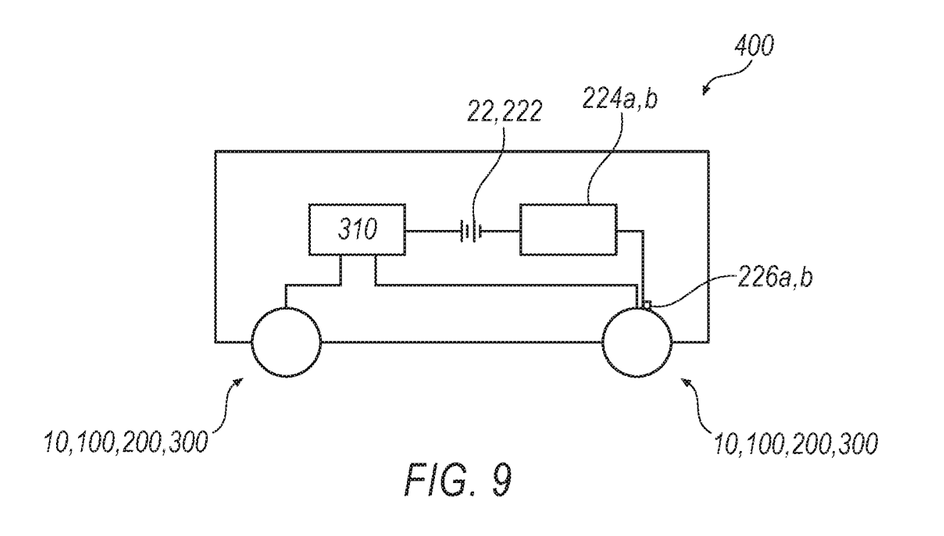
FIG. 9 is a schematic diagram of an exemplary vehicle employing a magnetic elevated wheel assembly.

Referring now to FIG. 9, an exemplary vehicle 400 employing a magnetic elevated wheel assembly is illustrated. Vehicle 400 may be, but is not limited to, an automobile, a train car(s), a bicycle, a skateboard, and the like, and may incorporate any one of the wheel assemblies 10, 100, 200, or 300 described above. While FIG. 9 depicts vehicle 400 as only having two wheel assemblies 10, 100, 200, 300, it should be appreciated that vehicle 400 may incorporate any number of wheel assemblies 10, 100, 200, 300. Vehicle 400 may also include a controller 410, for example, where vehicle 400 implements wheel assemblies 10, 200, or 300. The controller 410 generally may control each of the wheel assemblies 10, 200, 300. To achieve this, the controller 410 may be in communication with the power source 22, 222, the magnetic force regulator(s) 24, 224a, 224b, and/or the pressure sensor(s) 26, 226a, 226b. The controller 410 may also keep track of information, including, but not limited to, life of the power source 22, 222, and overall performance of the magnetic wheel assemblies 10, 200, 300. The controller 410 may store the information in a data store (not shown) and/or may be configured to transmit the information to a display and/or graphic user interface (not shown) where the performance of the wheel assemblies 10, 200, 300 may be monitored and/or controlled. Where vehicle 400 is a train employing multiple cars, each car may include its own controller 410 that may or may not be in communication with each other and/or with a master controller 410.

In general, computing systems and/or devices, such as the controller 410, may include at least one memory and at least one processor. Moreover, they may employ any of a number of computer operating systems, including, but not limited to, versions and/or varieties of the Microsoft Windows® operating system, the Unix operating system (e.g., the Solaris® operating system distributed by Oracle Corporation of Redwood Shores, Calif.), CentOS, the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, a notebook, a laptop, a handheld computer, a smartphone, a tablet, or some other computing system and/or device.

Such computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Objective C, Visual Basic, Java Script, Perl, Tomcat, representational state transfer (REST), etc. In general, the processor (e.g., a microprocessor) receives instructions, e.g., from the memory, a computer-readable medium, etc., and executes these instructions, thereby performing one or more processes including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instruction) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including, but not limited to, coaxial cables, copper wire, and fiber optics, including the wires that comprise a system bus coupled to a processor of a computer. Common forms of computer-readable media include, for example, a floppy disk, a flexible disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Alternatively, the application software product may be provided as hardware or firmware, or combinations of software, hardware, and/or firmware.

Figure 10:
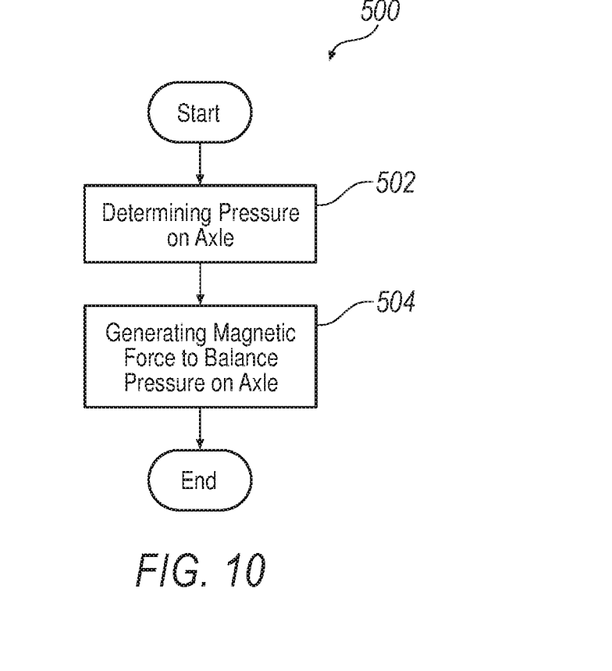
FIG. 10 is a schematic flow diagram of an exemplary process for operating a magnetic elevated wheel assembly.

Referring now to FIG. 10, an exemplary process 500 for operating a magnetic elevated wheel assembly 10, 100, 200, or 300 is illustrated. The process 500 may begin at block 502 in which a weight on an axle 14, 114, 214, 314 is determined. This may be accomplished by determining a total weight of the vehicle 400 in which the wheel assembly 10, 100, 200, 300 is employed, and determining the distribution of the weight on the axle 14, 114, 214, 314. In addition to or alternatively, at least one pressure sensor 26, 126, 226a, 226b may be used to measure the weight in real time. At block 504, a magnetic force may be generated to act on a supporting shell 28, 128, 228, 328 to balance at least a portion of the weight determined to be acting on the axle 14, 114, 214, 314 and the rolling resistance. Where the magnet is an electromagnet as in wheel assemblies 10, 200, and 300, the magnetic force may be generated by generating a current by a power source 22, 222, and passing the current through at least one coil 20, 220a, 220b wrapped around the magnets 18a, 18b, 218a, 218b. Further, the current may be regulated by one or more magnetic force regulators 24, 224a, 224b connected to the pressure sensor(s) 26, 126, 226a, 226b. This may allow the current flowing through the coil(s) 20, 220a, 220b to be adjusted in real time to account for changes in the weight on the axle 14, 114, 214, 314, as may be measured by the pressure sensor(s) 26, 126, 226a, 226b, and the rolling resistance.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A rotary assembly of a vehicle comprising:
at least one wheel mounted on an axle;
at least one magnet mounted on at least one of the axle and a vehicle body; and
a shell connected to the at least one wheel and extending from the at least one wheel in an axial direction and positioned radially outward of at least a portion of the at least one magnet;
wherein the at least one magnet is configured and oriented to generate a magnetic force acting on the shell to elevate at least a portion of a weight of the vehicle acting on the axle to balance a rolling resistance acting on the at least one wheel.

2. The rotary assembly of claim 1, wherein the at least one magnet is an electromagnet.

3. The rotary assembly of claim 2, further comprising:
at least one coil wrapped around the at least one magnet; and
a power source connected to the at least one coil and configured to generate a current to flow through the at least one coil.

4. The rotary assembly of claim 3, further comprising:
at least one pressure sensor configured to measure the weight on the axle; and
at least one magnetic force regulator connected to the at least one pressure sensor and to the power source, the at least one regulator being configured to regulate a magnetic force generated by the power source.

5. The rotary assembly of claim 4, wherein the at least one regulator is configured to regulate the magnetic force to equal the weight measured by the at least one pressure sensor.

6. The rotary assembly of claim 4, wherein the at least one magnet includes two magnets each, the at least one pressure sensor includes two pressure sensors at different locations, and the at least one magnetic force regulator includes two magnetic force regulators each connected to the power source and one of the at least one coil, each regulator being configured to regulate the current flowing through the coil to which it is connected.

7. The rotary assembly of claim 1, wherein the at least one wheel includes two wheels with the shell positioned therebetween in the axial direction.

8. The rotary assembly of claim 1, wherein the shell is made of steel.

9. The rotary assembly of claim 1, wherein the at least one magnet is a permanent magnet.

10. A vehicle comprising:
at least one axle and a vehicle body; and
at least one rotary assembly having:
at least one wheel mounted on the at least one axle;
at least one magnet mounted on at least one of the at least one axle and the vehicle body; and
a shell connected to the at least one wheel and extending from the at least one wheel in an axial direction and positioned radially outward of at least a portion of the at least one magnet;
wherein the at least one magnet is configured and oriented to generate a magnetic force acting on the shell to elevate at least a portion of a weight of the vehicle acting on the axle to balance a rolling resistance acting on the at least one wheel.

11. The vehicle of claim 10, wherein the at least one magnet is an electromagnet.

12. The vehicle of claim 11, wherein the at least one rotary assembly further includes:
at least one coil wrapped around the at least one magnet; and
a power source connected to the at least one coil and configured to generate a current to flow through the at least one coil.

13. The vehicle of claim 12, wherein the at least one rotary assembly further includes:
at least one pressure sensor configured to measure the weight on the axle; and
at least one magnetic force regulator connected to the at least one pressure sensor and to the power source, the at least one regulator being configured to regulate a magnetic force generated by the power source.

14. The vehicle of claim 13, wherein the at least one regulator is configured to regulate the magnetic force to equal the weight measured by the at least one pressure sensor.

15. The vehicle of claim 10, wherein the at least one magnet includes two magnets each with a coil wrapped around it, and the at least one rotary assembly further comprises two pressure sensors at different locations, and two magnetic force regulators each connected to the power source and one of the at least one coil, each regulator being configured to regulate the current flowing through the coil to which it is connected.

16. The vehicle of claim 10, wherein the at least one wheel includes two wheels with the shell positioned therebetween in the axial direction.

17. A process comprising:
    determining a weight on an axle on which at least one wheel assembly is mounted, the at least one wheel assembly including at least one wheel mounted on the axle, at least one magnet mounted on at least one of the axle and a vehicle body, and a shell connected to the at least one wheel and extending from the at least one wheel in an axial direction and positioned radially outward of at least a portion of the at least one magnet; and
    generating a magnetic force to act on the shell to elevate at least a portion of the weight on the axle to balance a rolling resistance acting on the at least one wheel.

18. The process of claim 17, wherein determining the weight on the axle includes measuring, by at least one pressure sensor, the weight on the axle.

19. The process of claim 18, wherein generating the magnetic force includes:
    generating, by a power source, a current; and
    passing the current through at least one coil wrapped around the at least one magnet.

20. The process of claim 19, wherein generating the magnetic force further includes regulating, by a magnetic force regulator, a magnetic force generated by the power source and passing through the at least one coil.

* * * * *